United States Patent [19]
Moss et al.

[11] Patent Number: 5,963,421
[45] Date of Patent: Oct. 5, 1999

[54] DISPLAY ASSEMBLY STIFFENING APPARATUS

[75] Inventors: David L. Moss; Andrew W. Moore, both of Austin, Tex.

[73] Assignee: Dell USA, L.P., Round Rock, Tex.

[21] Appl. No.: 08/987,256

[22] Filed: Dec. 9, 1997

[51] Int. Cl.⁶ .................................................. G06F 1/16
[52] U.S. Cl. .......................................... 361/681; 361/683
[58] Field of Search .................... 361/681, 682, 361/683; 248/918, 917

[56] References Cited

U.S. PATENT DOCUMENTS

| | | | |
|---|---|---|---|
| 5,008,976 | 4/1991 | Busch | 16/276 |
| 5,100,098 | 3/1992 | Hawkins | 248/917 |
| 5,146,390 | 9/1992 | Wong | 361/427 |
| 5,422,751 | 6/1995 | Lewis et al. | 354/83 |
| 5,486,942 | 1/1996 | Ichikawa et al. | 359/83 |
| 5,570,276 | 10/1996 | Ma | 361/681 |
| 5,646,818 | 7/1997 | Hahn | 361/681 |
| 5,682,182 | 10/1997 | Tsubosaka | 361/683 |
| 5,831,696 | 11/1998 | Sheng | 361/681 |

*Primary Examiner*—Lynn D. Feild
*Assistant Examiner*—Lisa S. Lea-Edmonds
*Attorney, Agent, or Firm*—Skjerven, Morrill, MacPherson, Franklin & Friel, L.L.P.; Marc R. Ascolese

[57] ABSTRACT

Flexing of a display assembly for a flat panel display can be advantageously minimized or eliminated by a stiffener apparatus that is an adhesive backed thin member attached directly to the front or viewing side of the flat panel display device. The stiffener apparatus is also attached to a mounting bracket of the display assembly, or to another portion of the display assembly, in order to provide the desired stiffness. Additionally, should the display device be removed from the assembly for service, another advantage of the stiffener apparatus is that it remains with the display device and can readily be reattached to the mounting bracket or other portion of the display assembly.

31 Claims, 4 Drawing Sheets

DISPLAY ASSEMBLY STIFFENING APPARATUS

BACKGROUND OF THE INVENTION

1. Field of the Invention

This invention relates to computer displays and methods for their manufacture, and more particularly to structures that enhance a display's stiffness.

2. Description of the Related Art

Flat panel displays are typically used as display devices in portable computer systems, and are increasingly being used as displays for conventional computer systems, for example desktop computer systems and workstations. Because flat panel display devices are relatively thin, a display assembly is also relatively thin, and therefore it is often convenient to attach the display assembly to a computer system using a clutch system or hinges. Such attachment is very common in portable computer systems.

The display clutch in a portable computer is the interface between the display assembly and the base of the computer. The clutch allows the display to pivot open and closed, and its resistance to torque allows the weight of the display assembly to be supported, thereby opposing gravity. Portable computers typically have a clamshell design where the base of the computer forms one part, and the display assembly forms the second part. The display assembly usually includes a rear shell or housing, a front cover or bezel with an opening for viewing the display device, a display device sandwiched in-between, and associated hardware (e.g. hinges, clutch supports, shafts and mounting brackets). The display assembly, and indeed the entire case of the portable computer, is usually constructed from plastic. Additionally, the most common way to open and close the portable computer is by grasping the display assembly at a point farthest from the hinge. The opening and closing forces imposed by a user are transmitted through the display assembly to the display clutch, leading to flexing of the display assembly as the user works to overcome the resistance of the clutch.

Consequently, flexing of display assemblies in computer systems that use flat panel displays, particularly portable computer systems, is quite often a source of design frustration and can result in a perception of poor quality on the part of users. Moreover, unwanted flexing in a display assembly can lead to structural weakness or failure of the display assembly and one or more of its components.

FIG. 1 illustrates a prior art design for flat panel displays used in portable computers. Display assembly 100 includes display shell 105 which provides a rear support and housing for display device 110. Display device 110 can be any type of flat panel display device including, for example, liquid crystal displays, plasma displays, and field emission displays. Display device 110 is secured to display shell 105 by way of frame 115. Frame 115 extends around the periphery of display device 110, including the sides and portions along the top surface of the display device near its edges. Frame 115 can be a separate frame, or an integral portion of display device 110, and typically includes through-holes or lugs through which fasteners can secure the display device to the shell. Mounting bracket 120 attaches and secures the display shafts 130 to the display shell 105. Display clutches 140 are coupled to the base (not shown) of the portable computer and receive shafts 130. Display device 110 is itself relatively stiff, adding to the stiffness of the display assembly, but only to the point of its lowest attachment to display shell 105. Similarly, mounting bracket 120 also adds stiffness to the display assembly, but only to the extent that it is attached to display shell 105.

FIG. 2 is a partial cross-sectional view of display assembly 100. Mounting bracket 120 is attached to display shell 105 (possibly through shafts 130) using fastener 125, thereby sandwiching display shaft 130 between itself and the display shell. Reference number 200 indicates a weak region of the display assembly located between mounting bracket 120 and display device 110. As mentioned above, display device 110 and mounting bracket 120 provide stiffness to the display assembly to the extent that 110 and 120 are themselves stiff, and limited by their attachment to display shell 105. In operation, a force applied to display assembly 100 results in a torque load transferred at weak region 200. So for example, when a force is applied to the assembly in the closing direction, display assembly 100 flexes at weak region 200, causing mounting bracket 120 and display device 110 to be deflected toward each other. When a force is applied to the assembly in the opening direction, display assembly 100 flexes at weak region 200, causing mounting bracket 120 and display device 110 to be deflected away each other. Both types of flexing, but particularly the latter type, give users the perception of poor quality, and the unwanted flexing in the display assembly can lead to structural weakness and/or failure of the display assembly and its components.

Prior methods of preventing undesirable flexing in display assemblies have proven to be unsatisfactory. Stiffening agents added to the plastic of the display shell offer minimal incremental stiffness to the assembly and add the risk of brittleness and cracking. A bezel or front display shell portion adds slightly to the stiffness of a display assembly, but a bezel or front display shell cannot be structurally tied to a display device adequately, and therefore the added stiffness is not significant. Increasing the thickness of the display shell and/or adding ribs to the display shell in the weak region can eliminate some of the flexing, but these solutions do not sufficiently eliminate flexing and may add unwanted thickness to the display assembly. Some designs have extended the mounting bracket up and behind the display device thus adding another layer of much stiffer material to the weak region. However, this solution includes significant weight and thickness penalties.

Accordingly, it is desirable to have a simple, thin, light component that can be included in a display assembly and minimizes flexing of the display assembly.

SUMMARY OF THE INVENTION

It has been discovered that flexing of a display assembly for a flat panel display can be advantageously minimized or eliminated by a stiffener apparatus that is an adhesive backed thin member attached directly to the front or viewing side of the flat panel display device. The stiffener apparatus is also attached to the mounting bracket of the display assembly, or to another portion of the display assembly in order to provide the desired stiffness. Additionally, should the display device be removed from the assembly for service, another advantage of the stiffener apparatus is that it remains with the display device and can readily be reattached to the mounting bracket or other portion of the display assembly.

Accordingly, one aspect of the present invention provides a stiffener capable of enhancing the stiffness of a display assembly for a flat panel display. The stiffener includes a planar member having a top surface, an opposing bottom surface, and a plurality of edge surfaces. The stiffener also includes a mating surface selected from the top surface, the bottom surface, and the plurality of edge surfaces. The mating surface is securable to a periphery of a display device. An attachment feature is also included in the stiffener, and the attachment feature allows the stiffener to be removably attached to a portion of the display assembly.

In another aspect of the invention, a computer system includes a processor, a memory electrically coupled to the processor, and a display assembly. The display assembly includes a display shell, a display device coupled to the display shell and electrically coupled to the processor, and a stiffener. The stiffener comprises a planar member having a top surface, an opposing bottom surface, and a plurality of edge surfaces. The stiffener also includes a mating surface selected from the top surface, the bottom surface, and the plurality of edge surfaces, and the mating surface is secured to a periphery of the display device. An attachment feature of the stiffener is used to attach the stiffener to a portion of the display assembly.

In still another aspect of the invention, a method of manufacturing a flat panel display is disclosed. A mounting bracket is attached to a display shell. A stiffener is secured to a display device. The stiffener includes a planar member having a top surface, an opposing bottom surface, and a plurality of edge surfaces. The stiffener also includes a mating surface selected from the top surface, the bottom surface, and the plurality of edge surfaces. The mating surface is securable to a periphery of a display device. An attachment feature is also included in the stiffener, and the attachment feature allows the stiffener to be removably attached to a portion of the display assembly. The display device is placed in the display shell, abutting the mounting bracket. The stiffener is attached to the mounting bracket, and the display device is attached to the display shell.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
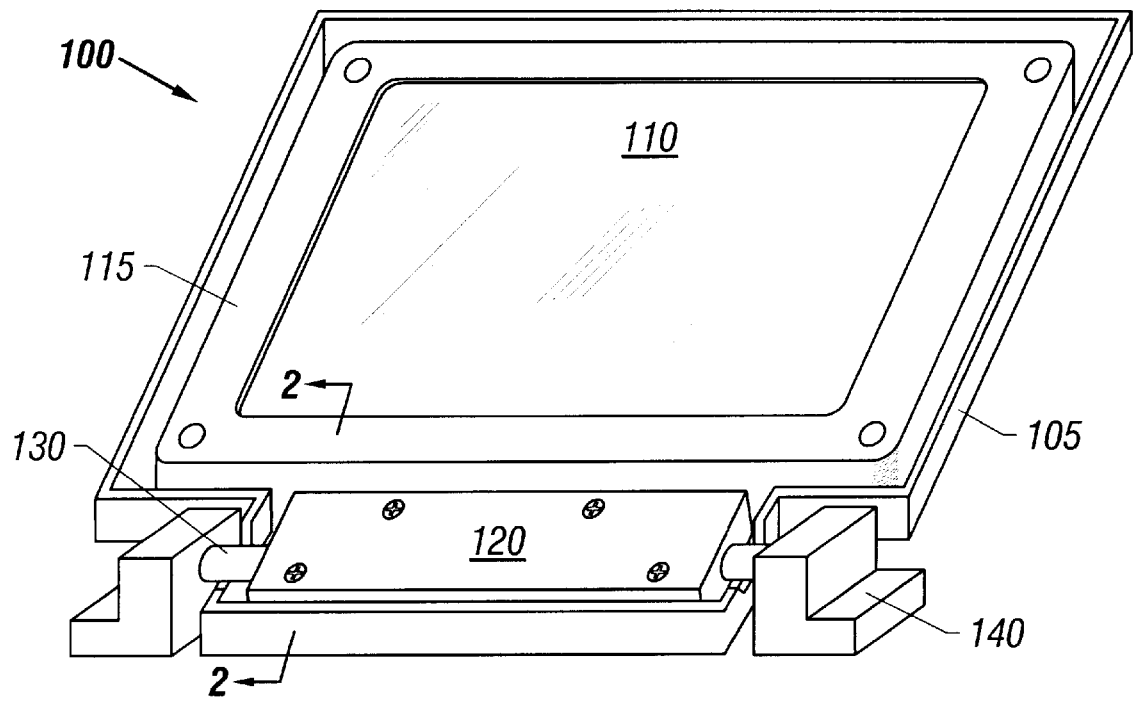
FIG. 1 illustrates a prior art display assembly for a portable computer.
Figure 2:
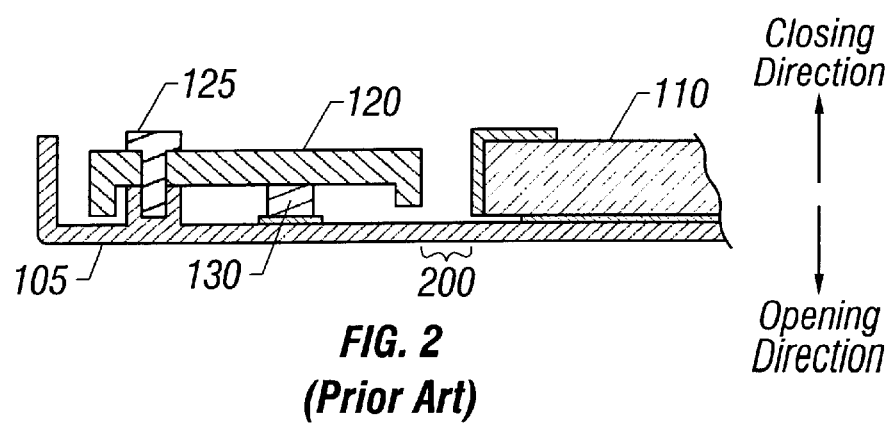
FIG. 2 is a partial cross-sectional view of the display assembly for a portable computer shown in FIG. 1.
Figure 3:
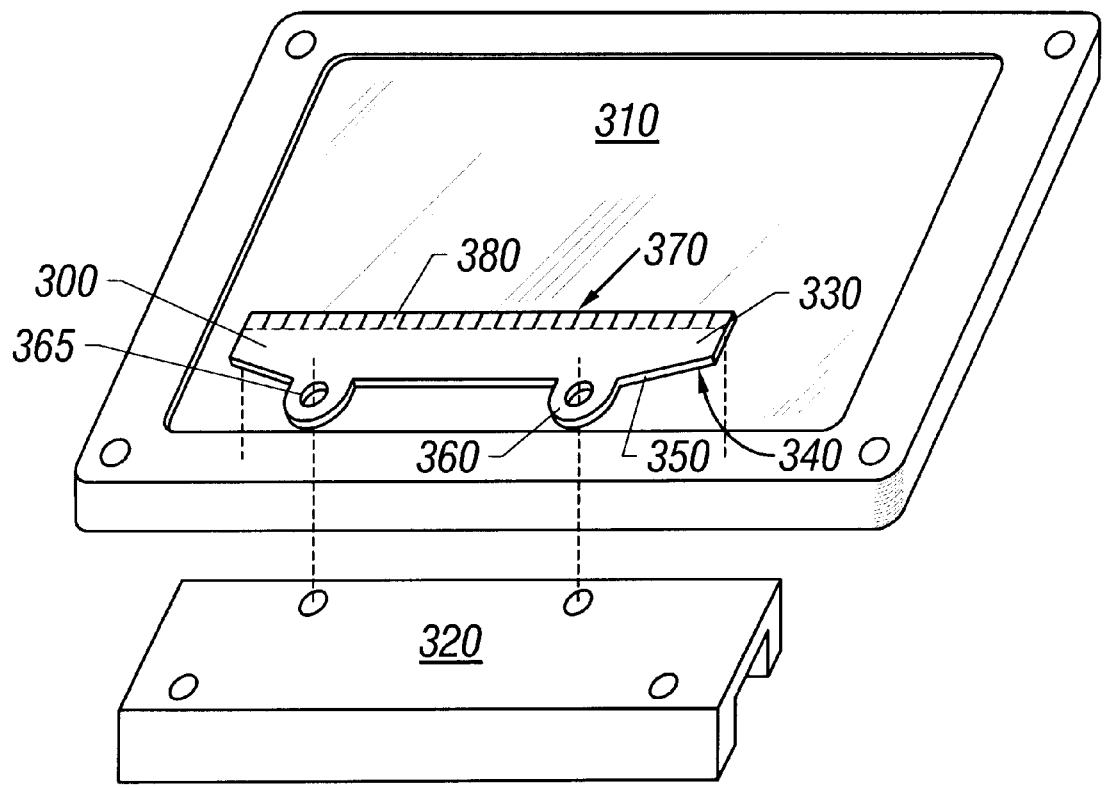
FIG. 3 illustrates a stiffener for a display assembly and shows one method of installing the stiffener on display assembly components.

Referring to FIG. 3, a stiffener 300 capable of enhancing the stiffness of a display assembly is shown. Stiffener 300 is a planar member having a top surface 330, an opposing bottom surface 340, and a plurality of edge surfaces 350. The stiffener also includes attachment features 360 allowing the stiffener to be attached to a portion of or a component of a display assembly. The attachment features illustrated are lugs that include through-holes through which the stiffener may be fastened to a portion/component of the display assembly. A variety of different attachment features can be included in stiffener 300, for example locking tabs, clips, slots and hooks. Stiffener 300 also includes a mating surface 370. Any of the stiffener surfaces (i.e. top surface 330, bottom surface 340, or edge surfaces 350) or any portion of those surfaces can be used as a mating surface. As shown, mating surface 370 is a portion of bottom surface 340 and includes an adhesive 380 so that the stiffener can be secured to display device 310. Adhesive 380 is any suitable adhesive glue, tape, foam or film that is sufficiently strong to secure stiffener 300 to display device 310. One example of such an adhesive is provided by 3M Corporation under the tradename VHB™ Tape. Alternatively, stiffener 300 can be secured to display device 310 by welding, or other suitable joining techniques.

FIG. 3 also illustrates the manner in which stiffener 300 is installed into a display assembly. Mating surface 370 overlaps with a portion of display device 310 (or a frame of display device 310) providing sufficient area for adhesive 380 to bond the stiffener and the display device together. Through-holes 365 of lugs 360 are located in alignment with holes in mounting bracket 320, thereby allowing stiffener 300 to be attached to the mounting bracket. Although stiffener 300 is shown as attachable to mounting bracket 320, the stiffener can be secured to a variety of different portions or components of the display assembly (See, e.g FIG. 6). Additionally, stiffener 300 can be constructed from a variety of materials including plastic, metal, wood, and cardboard.

Figure 4:
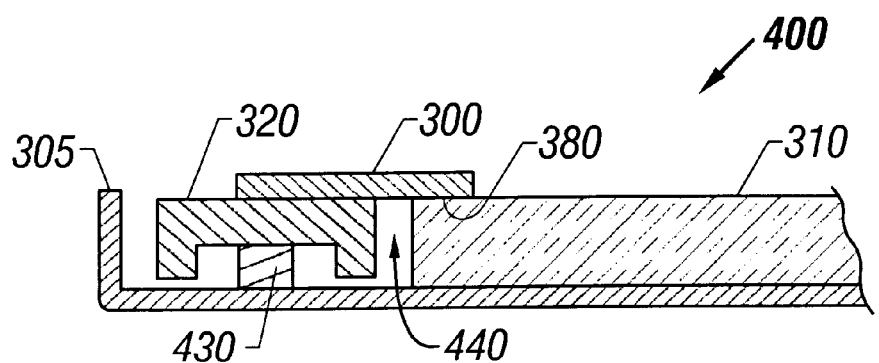
FIG. 4 is a simplified cross-sectional view of the stiffener of FIG. 3 installed into a display assembly.

FIG. 4 is a simplified cross-sectional view of a display assembly 400 with a stiffener 300 installed. Mounting bracket 320 secures shaft 430 to display shell 305. Stiffener 300 is attached to mounting bracket 320 via a fastener (not shown) and secured to display device 310 with adhesive 380. Consequently, flexing in the weak region of the display assembly is limited by stiffener 300 when display assembly 400 experiences opening and closing forces. Gap 440 is shown to illustrate that depending upon the dimensional tolerances of various display assembly components, there may still be some space between components that can lead to undesirable flexing. Such flexing can be eliminated by including one or more spacers as part of one or more of the display assembly components as illustrated in FIGS. 5A–C.

Figure 5A:
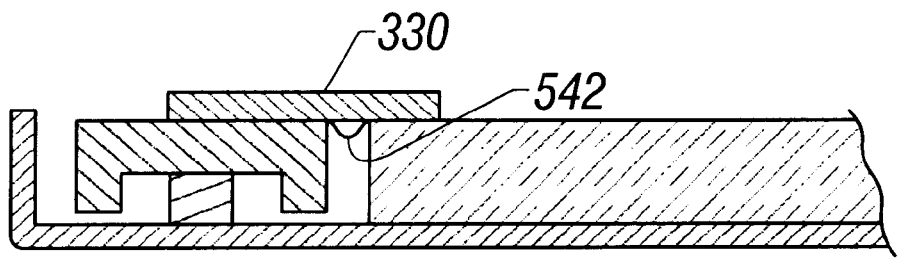
FIGS. 5A–C illustrate several different embodiments of the stiffener and other display assembly components.

FIG. 5A shows spacer 542 projecting from stiffener 330. Spacer 542 may be a spring (e.g. a leaf spring), a lance, a crush rib, a plastic projection, or any other device suitable for providing support between display assembly components. FIG. 5B shows spacer 544 projecting from mounting bracket 320. Spacer 544 is shown as a spring, but may be any suitable spacer device as discussed above. Similarly, FIG. 5C shows spacer 546 projecting from display shell 305. Spacer 546 is an integral portion of the display shell, but may alternatively be any of the spacer devices previously discussed. A spacer (not shown) may also project from the display device 310, or any other appropriate display assembly component. Additionally, spacers need not be an integral portion of a display assembly component, but can be attached to the components or simply located between the components in the gap region.

Figure 5B:
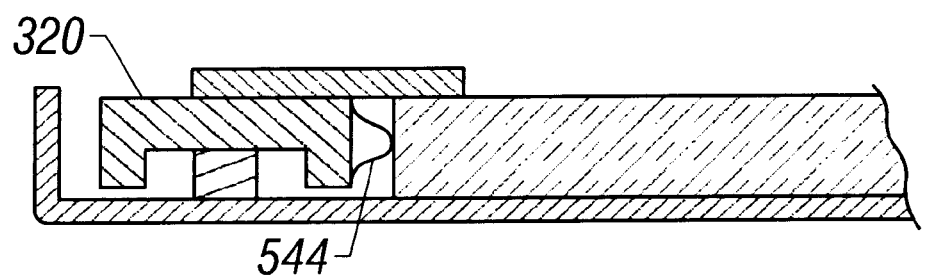
Figure 5C:
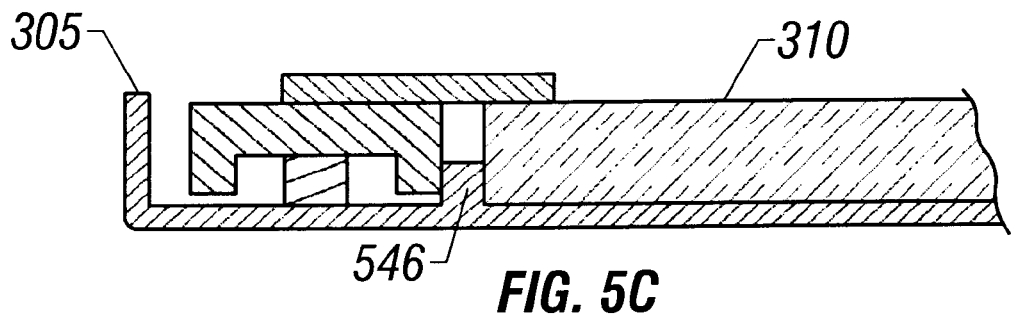

In addition to, or instead of the spacers shown in FIGS. 5A–C, a manufacturing method can be used to minimize the gap between display assembly components, for example gap 440 of FIG. 4. Typically, flat panel displays are assembled with the components, particularly the display shell and the display device, in a horizontal orientation, e.g. lying flat on a work surface. If instead, the display assembly is assembled when the display components, including for example, the display shell, the display device, and a mounting bracket, are substantially vertical, the display device will naturally shift into contact with the mounting bracket because of the display devices weight. In this manner, a compressive joint is made and gap 440 is minimized or eliminated.

Figure 6:
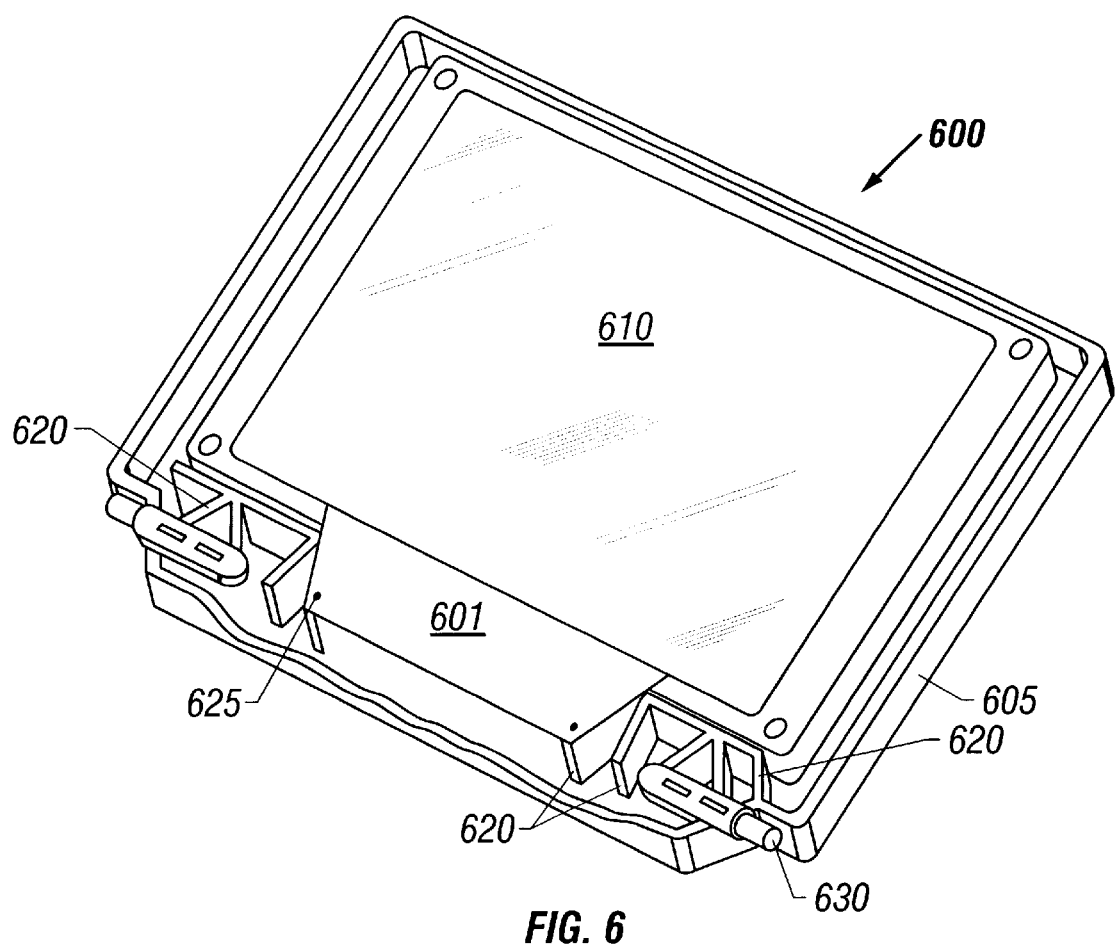
FIG. 6 illustrates another example of a stiffener installed in a display assembly.

FIG. 6 illustrates another example of a display assembly 600 that includes a stiffener 601. Instead of using a separate mounting bracket like mounting bracket 320 of FIG. 3, display shell 605 includes support ribs 620 that support display device 610 and hinges 630. Additionally, support ribs 620 include pins 625 for attaching stiffener 601 to the display shell. Alternatively, stiffener 601 may include any of the previously discussed attachment features that may be accommodated by support ribs 620 or some other portion of display shell 605. Stiffener 601 is secured to display device 610 using an adhesive or an appropriate joining technique as discussed above.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A stiffener capable of enhancing the stiffness of a display assembly for a flat panel display, the stiffener comprising:
   a planar member having a top surface, an opposing bottom surface, and a plurality of edge surfaces;
   a mating surface selected from the top surface, the bottom surface, and the plurality of edge surfaces, the mating surface being securable to a periphery of a display device; and
   an attachment feature, the attachment feature allowing the stiffener to be removably attached to a portion of the display assembly.

2. The stiffener of claim 1 wherein the planar member is constructed from a material selected from plastic, metal, wood, and cardboard.

3. The stiffener of claim 1 wherein the mating surface includes an adhesive, the adhesive capable of bonding the stiffener to the display device.

4. The stiffener of claim 1 wherein the mating surface is capable of being welded to the display device.

5. The stiffener of claim 1 wherein the attachment feature is a lug.

6. The stiffener of claim 5 wherein the lug includes a through-hole capable of receiving a fastener.

7. The stiffener of claim 1 wherein the attachment feature is a locking tab.

8. The stiffener of claim 1 further comprising a spacer projecting from one of the top surface and the bottom surface, the spacer being capable of fitting between the display device and the portion of the display assembly when the stiffener is secured to the display device and attached to the portion of the display assembly.

9. The stiffener of claim 8 wherein the spacer is selected from a spring and a crush rib.

10. The stiffener of claim 1 coupled into a display assembly including a display shell, a display device coupled to the display shell, and a mounting bracket coupled to the display shell, wherein the portion of the display assembly is the mounting bracket, the stiffener being attached to the mounting bracket, and the stiffener being secured to the display device.

11. The stiffener of claim 10 wherein the display shell includes a spacer projecting from a surface of the display shell, the spacer being located between the display device and the mounting bracket.

12. The stiffener of claim 10 wherein the mounting bracket includes a spacer projecting from mounting bracket, the spacer being located between the display device and the mounting bracket.

13. The stiffener of claim 1 coupled into a display assembly including a display shell, and a display device coupled to the display shell, wherein the portion of the display assembly is the display shell, the stiffener being attached to the display shell, and the stiffener being secured to the display device.

14. A computer system comprising:
   a processor;
   a memory electrically coupled to the processor; and
   a display assembly including:
      a display shell;
      a display device coupled to the display shell and electrically coupled to the processor; and
      a stiffener including:
         a planar member having a top surface, an opposing bottom surface, and a plurality of edge surfaces;
         a mating surface selected from the top surface, the bottom surface, and the plurality of edge surfaces, the mating surface being secured to a periphery of the display device; and
         an attachment feature whereby the stiffener is attached to a portion of the display assembly.

15. The computer system of claim 14 wherein the portion of the display device is the display shell and the stiffener is attached to the display shell.

16. The computer system of claim 14 wherein display assembly includes a mounting bracket coupled to the display shell, the portion of the display device is the mounting bracket, and the stiffener is attached to the mounting bracket.

17. The computer system of claim 14 wherein the planar member is constructed from a material selected from plastic, metal, wood, and cardboard.

18. The computer system of claim 14 wherein the mating surface includes an adhesive.

19. The computer system of claim 14 wherein the mating surface is welded to the display device.

20. The computer system of claim 14 wherein the attachment feature is a lug.

21. The computer system of claim 20 wherein the lug includes a through-hole capable of receiving a fastener.

22. The computer system of claim 14 wherein the attachment feature is a locking tab.

23. The computer system of claim 14 further comprising a spacer projecting from one of the top surface and the bottom surface, the spacer fitting between the display device and the portion of the display assembly when the stiffener is secured to the display device and attached to the portion of the display assembly.

24. The computer system of claim 23 wherein the spacer is selected from a spring and a crush rib.

25. The computer system of claim 16 wherein the display shell includes a spacer projecting from a surface of the display shell, the spacer being located between the display device and the mounting bracket.

26. The computer system of claim 16 wherein the mounting bracket includes a spacer projecting from mounting bracket, the spacer being located between the display device and the mounting bracket.

27. A method of assembling a flat panel display comprising:

attaching a mounting bracket to a display shell;

securing a stiffener to a display device, the stiffener including:
- a planar member having a top surface, an opposing bottom surface, and a plurality of edge surfaces;
- a mating surface selected from the top surface, the bottom surface, and the plurality of edge surfaces, the mating surface being securable to a periphery of a display device; and
- an attachment feature, the attachment feature allowing the stiffener to be removably attached to a portion of the display assembly;

placing the display device in the display shell and abutting the mounting bracket;

attaching the stiffener to the mounting bracket; and attaching the display device to the display shell.

28. The method of claim 27 wherein the placing the display device step is performed the while both the display device and the display shell are in a substantially vertical orientation, thereby allowing the display device to rest against the mounting bracket.

29. The method of claim 27 wherein the stiffener is secured to the display device with adhesive.

30. The method of claim 27 wherein the stiffener is attached to the mounting bracket with a fastener.

31. The method of claim 27 wherein the display device is attached to the display shell with a plurality of fasteners.

* * * * *